(12) United States Patent
Florit et al.

(10) Patent No.: US 7,969,980 B1
(45) Date of Patent: Jun. 28, 2011

(54) INTERNET PROTOCOL MULTICAST DISTRIBUTION IN ETHERNET NETWORKS

(75) Inventors: Lionel Florit, Greenbrae, CA (US); Robert W. Klessig, Los Altos Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 1114 days.

(21) Appl. No.: 10/838,882

(22) Filed: May 4, 2004

(51) Int. Cl.
 *H04L 12/28* (2006.01)
 *H04L 12/56* (2006.01)
 *G06F 15/173* (2006.01)

(52) U.S. Cl. ......... 370/390; 370/409; 370/432; 709/238

(58) Field of Classification Search .................. 370/390, 370/409, 432; 709/238
See application file for complete search history.

(56) References Cited

U.S. PATENT DOCUMENTS

| | | | |
|---|---|---|---|
| 6,771,673 B1 * | 8/2004 | Baum et al. | 370/535 |
| 6,847,638 B1 * | 1/2005 | Wu et al. | 370/389 |
| 7,031,297 B1 * | 4/2006 | Shabtay et al. | 370/352 |
| 7,130,303 B2 * | 10/2006 | Hadzic | 370/389 |
| 7,339,929 B2 * | 3/2008 | Zelig et al. | 370/390 |
| 7,382,781 B1 * | 6/2008 | Sridhar et al. | 370/395.21 |
| 7,386,010 B2 * | 6/2008 | Solomon et al. | 370/466 |
| 7,447,203 B2 * | 11/2008 | Chen et al. | 370/389 |
| 7,698,455 B2 * | 4/2010 | Jalan et al. | 709/238 |
| 2003/0123453 A1 | 7/2003 | Ooghe et al. | 370/395.53 |
| 2005/0080901 A1 * | 4/2005 | Reader | 709/226 |

OTHER PUBLICATIONS

Anatoly Moldovansky, "Utilization of Modern Switching Technology in EtherNet/IP™ Networks," submitted at the Technical University of Vienna, Austria Jun. 18, 2002 in conjunction with the 14th Euromicro Intl Conference on Real-Time Systems, Technical University of Vienna, Austria. Jun. 19-21, 2002, 3 pages, found at http://www.hurray.isep,ipp.pt/rtlia2002/full_papers/7_rtlia, printed Apr. 27, 2004.

"IP-Multicasting Technology Part 2: Switches vs. Routers," 5 pages, found at http://www.intelligraphics.com/articles/ipmulticasting2_article.html, printed Apr. 27, 2004, Copyright © 1995-2004 Intelligraphics Inc.

S. Deering, Stanford University, RFC 1112, "Appendix I. Internet Group Management Protocol (IGMP)," Aug. 1989, 4 pages, found at http://ww.freesoft.org/CIE/RFC/1112/18.htm, printed Apr. 27, 2004.

\* cited by examiner

*Primary Examiner* — Alpus H Hsu
(74) *Attorney, Agent, or Firm* — Campbell Stephenson LLP

(57) ABSTRACT

Methods and systems for distributing multicast messages in a network are disclosed. The use of such a method or system in an Ethernet network can result in a reduction in the number of flooded multicast messages. One method can involve receiving a companion message, which includes a multicast address, at a network device and extracting the multicast address from the companion message. The multicast address can then be associated with a VLAN and an interface of the network device. Another method involves receiving a join message, which identifies a multicast group being joined, and generating a companion message corresponding to the join message. The companion message includes an address of the multicast group.

60 Claims, 11 Drawing Sheets

INTERNET PROTOCOL MULTICAST DISTRIBUTION IN ETHERNET NETWORKS

FIELD OF THE INVENTION

This invention relates to networking and, more particularly, to the distribution of Internet Protocol (IP) multicast messages in Ethernet Networks.

BACKGROUND

Service providers use Metropolitan Area Networks (MANs) to provide customers with connectivity to the Internet and/or with connectivity to geographically diverse customer locations. Historically, MANs have been implemented using Synchronous Optical Networks (SONET), Frame Relay, or Asynchronous Transfer Mode (ATM) technologies. Recently, however, service providers have begun to use Ethernet technology to implement MANs. These Ethernet-based MANs are referred to as Metro Ethernet Networks (MENs).

Often, service providers implement Metro Ethernet Networks using devices, such as Ethernet switches, that provide purely Layer 2 (also referred to as data-link layer) functionality (as opposed to using routers or other devices that also perform Layer 3, or network layer, functions). In Ethernet networks, Layer 2 functionality includes the ability to forward messages based on the messages' Media Access Control (MAC) destination address and Virtual Local Area Network (VLAN). Ethernet devices that provide Layer 2 functionality "learn" that messages addressed to certain MAC addresses should be sent via certain interfaces. If an Ethernet device receives a message having an unknown MAC address (i.e., a MAC address that has not yet been learned by that Ethernet device), the Ethernet device will flood the message from all of the Ethernet device's interfaces in the incoming VLAN (i.e., the VLAN in which the message was received).

Network devices that perform Layer 2 Ethernet forwarding (as opposed to both Layer 2 and Layer 3 forwarding) flood messages with a multicast Media Access Control (MAC) address to all interfaces in an incoming VLAN. For example, the range of multicast MAC addresses is typically excluded from the range of addresses that an Ethernet device will learn, and thus the Ethernet device will not learn multicast addresses. Because of this, the Ethernet device will handle a multicast message as if the destination of that message was unknown. Accordingly, multicast messages are flooded throughout the appropriate VLAN in the Metro Ethernet Network.

Flooding multicast messages creates an inefficient use of resources within the Metro Ethernet Network. For example, if fewer than all of the User Network Interfaces (UNIs) within the Metro Ethernet Network are connected to receivers for a particular multicast flow, flooding messages in that multicast flow will cause a UNI that does not have receivers for that multicast flow to nevertheless flood multicast streams to an attached customer edge (CE) device, wasting both bandwidth on the link and processing cycles in the CE device.

When Ethernet Virtual Connections (EVCs) are implemented within a MEN, a flooded message is only flooded within the EVC of the interface via which the message was received into the MEN. However, even though this may shield uninterested devices in other EVCs from multicast messages being flooded in that EVC, inefficiencies can still arise within the EVC in which the multicast messages are flooded. Additionally, if several CE devices are connected by a multipoint-to-multipoint Ethernet Virtual Connection (EVC) within the Metro Ethernet Network, and if some CE devices are connected at different speeds, CEs connected at lower speeds can be overwhelmed by multicast flows that the lower-speed customer edge devices are not interested in receiving. For example, assume an EVC having UNIs connected to three CE devices. Two of the CE devices have 100 Mb/s (Megabit per second) connections while the third CE device has a 10 Mb/s connection. If a multicast flow is being transferred between the two CE devices having the 100 Mb/s consumes more than 10 Mb/s, the lower-speed CE device with the 10 Mb/s connection may even be unable to use its connections to the Metro Ethernet Network. As this example shows, improved techniques for handling multicast messages are desirable.

SUMMARY

Various embodiments of methods and systems for distributing multicast messages in a network are disclosed. The use of such a method or system in an Ethernet network can result in a reduction in the number of flooded multicast messages.

In one embodiment, a method involves receiving a companion message, which includes a multicast address, at a network device and then extracting the multicast address from the companion message. The companion message is a message that is associated with a join message of a Layer 3 multicast protocol. As part of the method, the multicast address is associated with a VLAN and an interface of the network device. The interface is coupled to a source of the join message. The interface can also be the interface via which the network device received the companion message. Program instructions executable to perform such a method can be stored upon a computer readable medium.

Another method involves receiving a join message, which identifies a multicast group being joined, and generating a companion message corresponding to the join message. The companion message includes an address of the multicast group. The join message is a join message of a Layer 3 multicast protocol. The message can also involve generating a second companion message corresponding to the join message if the join message identifies a second multicast group being joined. The second companion message includes a second multicast address of the second multicast group. Alternatively, if the join message identifies several multicast groups that are being joined, the companion message can include several multicast addresses, each of which corresponds to one of the multicast groups. Program instructions executable to perform such a method can be stored upon a computer readable medium.

In one embodiment, a system includes a companion message detector that includes a companion message identifier and a multicast address extractor. The companion message identifier is configured to identify a companion message, which is associated with a join message of a Layer 3 multicast protocol. The system can also include storage for information associated with a multicast address. The information can be stored in response to the companion message identifier identifying a companion message, which includes the multicast address. The storage can also store information associating the multicast address with a VLAN and an interface of a network device.

In another embodiment, a system includes a join message detector and a companion message generator coupled to the join message detector. The companion message generator is configured to generate a companion message in response to the join message detector detecting a join message of a Layer 3 multicast protocol. The join message identifies a multicast group being joined, and the companion message includes an address of the multicast group.

In one embodiment, a companion message includes a multicast address and a companion message type value. The companion message type value is an Ethertype value in one embodiment. The multicast address can be the source address of the companion message.

In some embodiments, a method involves determining usage of a companion message service by a customer and calculating an amount owed by the customer for the usage of the companion message service. Determining the usage of the companion message service can involve determining whether companion message generation is enabled in one or more edge devices included in an Ethernet Virtual Connection that is used by the customer.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
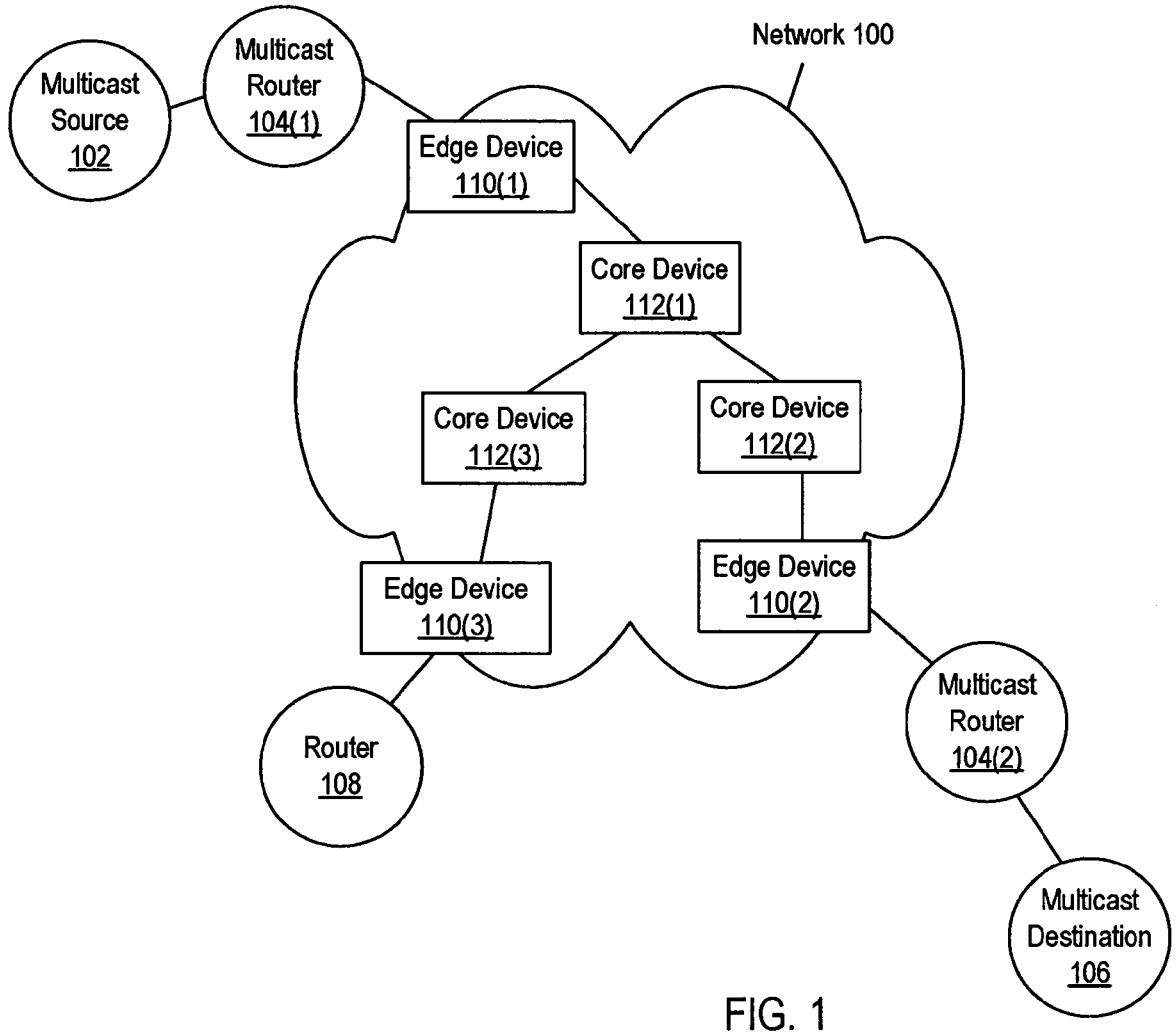
FIG. 1 is a block diagram of a Metro Ethernet Network (MEN) that uses companion messages, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Edge network devices (e.g., such as those implemented at the carrier-side of a User Network Interface (UNI) of a Metro Ethernet Network) snoop join messages being sent as part of a Layer 3 multicast routing protocol (e.g., such as Protocol Independent Multicast (PIM)) running between routers connected by a network. In response to detecting a join message, an edge network device generates one or more companion messages that correspond to the join message. The companion message includes the multicast address of the multicast group specified in the join message. The edge network device forwards the companion message to one or more other network devices within the network. These other devices extract the multicast address in response to receiving the companion message. The extracted multicast address can then be "learned" by associating the extracted multicast address with an interface and/or VLAN. The other network devices can then forward messages addressed to that multicast address based on the information associated with the multicast address (e.g., such as the information identifying the interfaces and/or VLAN to use to forward the messages) instead of flooding those messages.

Throughout this disclosure, the term "message" is used to refer to a logical grouping of information sent as a data unit over a transmission medium. Messages may include header and/or trailer information that surrounds user data contained in the data unit. For purposes of this disclosure, a "message" may include a cell, datagram, frame, packet, segment, or any other logical group of information.

FIG. 1 is a block diagram of network 100 that employs an embodiment of the currently invention. In this example, a service provider operates network 100, which is used to couple several geographically diverse customer locations (e.g., each representing a different office or campus within a corporation). One customer location (e.g., the corporation's headquarters) includes multicast source 102 and multicast router 104(1). Another location (e.g., a branch office) includes multicast router 104(2) and multicast destination 106. A third location includes router 108. The routers (e.g., multicast router 104(1), multicast router 104(2), and router 108) at each customer location are used to connect that customer location to network 100. Multicast source 102 and multicast destination 106 represent hosts that respectively generate and receive a multicast flow. A multicast flow is a set of one or more multicast messages being sent to the same multicast address. It is noted that each customer location can include various other devices in addition to those illustrated here.

Network 100 includes several network devices: edge devices 110(1)-110(3) and core devices 112(1)-112(3). These network devices perform Ethernet switching of messages being conveyed between customer locations. Edge devices 110(1)-110(3) are network devices that are located at the "edge" of network 100 and are coupled directly to customer equipment such as multicast router 104(1), multicast router 104(2), and router 108. Edge devices 110(1)-110(3) each provide a respective customer location with access to network 100. Core devices 112(1)-112(3) are network devices used to couple edge devices 112(1)-112(3). Core devices 112(1)-112(3) are not directly coupled to any customer equipment.

In this example, network 100 is a Metro Ethernet Network providing multipoint-to-multipoint connectivity by implementing a multipoint-to-multipoint Ethernet Virtual Connection (EVC) between several customer locations, represented by multicast router 104(1), multicast router 104(2), and router 108. In other embodiments, similar multipoint-to-multipoint connectivity can be provided using other types of networks (e.g., a Frame Relay network supporting embedded Ethernet switching).

Multicast routers 104(1) and 104(2) each run a Layer 3 multicast routing protocol, such as PIM (or a variation of PIM such as PIM-SM (Sparse Mode) or PIM-Bidir (Bidirectional)). According to the Layer 3 multicast routing protocol, router 104(2) sends a join message to multicast source 102 if any of the hosts connected to network 100 by multicast router 104(2) have requested to receive a multicast flow generated by multicast source 102. Multicast router 104(2) can detect that a host (e.g., multicast destination 106) is requesting to receive a multicast flow using a protocol such as IGMP (Internet Group Management Protocol). For example, multicast destination 106 can request to receive a multicast flow by sending an IGMP join message to multicast router 104(2). In response to receiving one or more IGMP join messages from one or more hosts requesting the multicast flow generated by multicast source 102, multicast router 104(2) can send a join message to multicast router 104(1) indicating that multicast router 104(2) wants to join the multicast group that receives the multicast flow generated by multicast source 102. The join message sent by multicast router 104(2) is generated according to a Layer 3 multicast routing protocol such as PIM. If PIM is being used, join messages are sent to destination address 224.0.0.13, which identifies all PIM routers. Multicast router 104(2) periodically resends the join message as long as one host is still interested in receiving the multicast flow.

The join messages sent by multicast router 104(2) include information, such as the multicast address of the multicast group, identifying the multicast group that at least one host connected to multicast router 104(2) has requested to join. This multicast address is an Internet Protocol (IP) multicast address in some embodiments.

In contrast to devices in a typical prior art system, edge devices 110(1)-110(3) "learn" multicast addresses in response to receiving multicast join messages that are entering network 100. An edge device learns a multicast address by associating information identifying one or more of that network device's interfaces with that multicast address. An edge device can also associate information identifying a VLAN with that multicast address as part of "learning" the multicast address. In particular, edge devices 110(1)-110(3) can detect Layer 3 multicast routing protocol join messages being sent into network 100 from customer equipment such as multicast router 104(2). In response to detecting a join message, edge devices 110(1)-110(3) associate the multicast addresses of any multicast groups specified in the join message with information identifying the VLAN and interface(s) to use to when forwarding messages addressed to those multicast addresses.

Edge devices 110(1)-110(3) also generate companion messages to core devices 112(1)-112(3) in response to receiving multicast join messages that are entering network 100. The companion messages include information that allows core devices 112(1)-112(3) to learn the multicast addresses by associating the multicast addresses with interfaces and/or VLANs. Edge devices 110(1)-110(3) then send these companion messages through network 100. Other devices, such as core devices 112(1)-112(3), then associate multicast addresses with interfaces and VLANs in response to receiving the companion messages. In some embodiments, the companion message generating functionality can be selectively enabled and disabled on edge devices 110(1)-110(3).

In some embodiments, edge devices 110(1)-110(3) each generate one companion message in response to detecting a join message, regardless of the number of multicast groups specified in the join message. In such embodiments, the multicast address(es) are included in the data field of the companion message. In alternative embodiments, edge devices 110(1)-110(3) generate one companion message per multicast group specified in the join message.

In one embodiment, edge devices 110(1)-110(3) do not send a companion message for each detected join message. Instead, edge devices 110(1)-110(3) send a companion message in response to the first join message detected from a particular router. Edge devices 110(1)-110(3) then send a companion message in response to every Nth join message sent by that router after the first join message. In an alternative embodiment, edge devices 110(1)-110(3) send a companion message every $t_1$ seconds so long as a join message is detected every $t_2$ seconds.

Edge devices 110(1)-110(3) can convey companion messages to core devices 112(1)-112(3) in a variety of different ways. For example, in one embodiment, each companion message is conveyed along the same path as the join message with which that companion message is associated. In such an embodiment, the destination address of each companion message can be the same as the destination address of the join message. Alternatively, the destination address of the companion message can be the address of the edge device coupled to the router to which the join message is being sent. In either situation, each companion message is sent in the same data network and VLAN as the associated join message. In other embodiments, companion messages are conveyed using a special management VLAN or a special data network that is used for management.

Figure 2A:
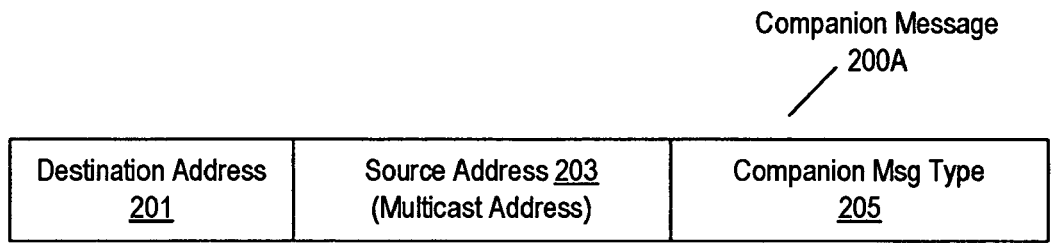
FIG. 2A shows a companion message, according to one embodiment.
Figure 2B:
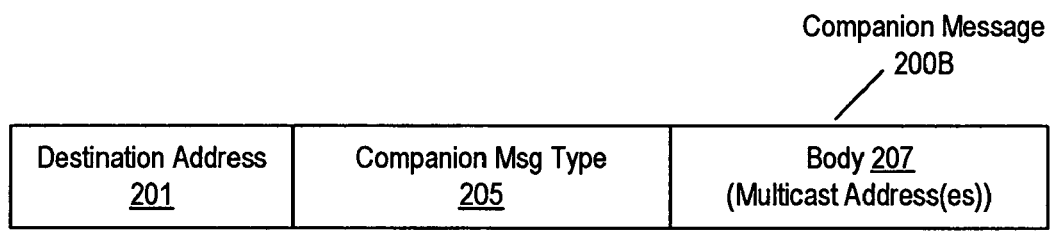
FIG. 2B shows a companion message, according to an alternative embodiment.
Figure 2C:
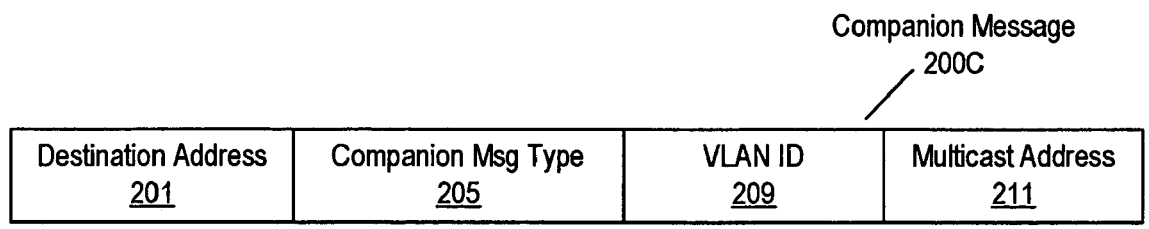
FIG. 2C shows a companion message, according to yet another embodiment.

Each companion message contains, at least, a multicast address. Additionally, each companion message includes a companion message type value (e.g., a unique Ethernet Type (Ethertype) value that is specific to companion messages), which differentiates the companion message from other messages being sent in network 100. FIGS. 2A-2C each illustrates an example of the information that can be included in a companion message. It is noted that the order of fields in each of companion messages 200A-200C are provided as an example. In other embodiments, the order, number, and/or type of fields included in a companion message can vary.

In some embodiments, edge devices 110(1)-110(3) convert IP multicast addresses included in join messages to appropriate MAC addresses and include these MAC addresses in the companion messages. For example, in one embodiment, for each IP multicast address specified in the join message sent by multicast router 104(2), edge device 110(2) generates a corresponding companion message. The MAC address that corresponds to the IP multicast address is used as the source address of the corresponding companion message. Such a companion message can be formatted as shown in FIG. 2A, where companion message 200A includes destination address 201, source address 203, and companion message ("msg") type 205. Source address 203 is the multicast MAC address. Companion message type 205 is a value that identifies the message as being a companion message. For example, companion message type 205 can be a unique value of an Ethertype field that identifies an Ethernet message as being a companion message.

In other embodiments, edge devices 110(1)-110(3) include IP multicast addresses in companion messages. For example, for each join message, an edge device generates a corresponding companion message that includes each IP multicast address specified in the join message. As shown in FIG. 2B, in such an embodiment, a companion message 200B includes destination address 201, companion message type 205, and body 207. Body 207 includes one or more multicast addresses.

A companion message can also include other information in addition to a multicast address. For example, network 100 may implement several different VLANs. In some embodiments, whenever one of edge devices 110(1)-110(3) generates a companion message, the edge device sends the companion message in the same VLAN as the corresponding join message. Each companion message includes information identifying the VLAN in which the corresponding join message is being conveyed. As an example, FIG. 2C illustrates how companion message 200C includes destination address 201, companion message type 205, VLAN identifier (ID) 209, and multicast address 211 (multicast address 211 can be included in the body or as the source address of companion message 200C).

In one embodiment, the edge devices 110(1)-110(3) include the information identifying the VLAN in a protocol tag within the companion message (e.g., this tag can be an 802.1Q tag defined by IEEE 802.1Q). In some embodiments, edge devices 110(1)-110(3) and core devices 112(1)-112(3) (collectively referred to as network devices) within network 100 support VLAN stacking (also referred to as Q-in-Q or 802.1Q-in-802.1Q) by allowing a hierarchical arrangement of multiple VLAN tags within the same message. An "inner" VLAN tag within the companion message identifies a VLAN within the customer's network and an "outer" VLAN tag identifies the VLAN within network 100 via which the customer's messages are conveyed. The outer VLAN tag identifies the VLAN corresponding to the EVC used to convey messages between the customer's locations. In such a situation, the VLAN corresponding to the EVC operates as a Layer 2 Virtual Private Network (VPN). A companion message includes a VLAN tag that identifies the outer VLAN corresponding to the EVC in which the join message is received.

The destination address of a companion message can be specified in a variety of different ways. In one embodiment, the destination address is selected to cause the companion message to be flooded through network 100 (or at least flooded within the EVC in which the join message is being conveyed). In other embodiments, the destination address is a standard destination address used to identify all Layer 3 multicast routers. Similarly, the destination address can be a standard destination address used to identify all edge devices 110(1)-110(3) within network 100. In alternative embodiments, a different copy of the companion message is addressed to each network device within the EVC or to each network device (e.g., core devices 112(1) and 112(2) and edge device 110(1)) between edge device 110(2), which is generating the companion message, and the multicast source 102.

Core devices 112(1)-112(3) as well as other edge devices 110(1) and 1102(3) associate the multicast address within information indicating the interface(s) and/or VLAN to use when forwarding messages addressed to the multicast address in response to receiving the companion message generated by edge device 110(2). For example, each core and edge device maintains a bridge table that stores information associating each of several MAC addresses with one or more of that network device's interfaces and with a VLAN. When a companion message is received, the network device allocates an entry in the bridge table to a multicast address specified in the companion message (if the multicast address is an IP address, the device can first convert the multicast address to an appropriate multicast MAC address).

In some embodiments, network devices that receive a companion message will associate the multicast address (or addresses) included in that companion message with the interface and VLAN via which that companion message is received. For example, looking at FIG. 1, if core device 112(1) receives a companion message from the interface leading towards core device 112(2), core device 112(1) will associate that the multicast address included in that companion message with the interface and VLAN leading towards core device 112(2). (An interface "leads towards" a particular device if that interface is coupled to the particular device, either directly or indirectly via one or more intervening network devices.) It is noted that a network device can associate the same multicast address with multiple interfaces in a given VLAN. For example, if core device 112(1) receives another companion message, which specifies the same multicast address as the earlier-received companion message, via the interface leading towards core device 112(3), core device 112(1) can associate that multicast address with both the interface leading towards core device 112(2) and the interface leading towards core device 112(3).

In alternative embodiments, companion messages are not received via the interface that will be associated with the multicast addresses included in the companion messages. For example, in some embodiments, edge devices 110(1)-110(3) and core devices 112(1)-112(3) are linked by a separate management network that is used to communicate management information within network 100. Companion messages can be sent via this separate management network. Similarly, in some embodiments, edge devices 110(1)-110(3) and core devices 112(1)-112(3) use a special management VLAN to communicate management information. Companion messages can be sent via this management VLAN. In embodiments like these where the companion message is conveyed in a different network or VLAN than the join message, the edge device that generates the companion message can encode information in the companion message that is indicative of which interface (and VLAN, in some embodiments) each other device should associate with each multicast address included in the companion message.

Edge devices 110(1)-110(3) and core devices 112(1)-112(3) use the information (e.g., identifying one or more interfaces and a VLAN) those devices have associated with a multicast address to forward messages addressed to that multicast address via the associated interfaces in the associated VLAN (instead of flooding messages addressed to that multicast address from all interfaces in the incoming VLAN). For example, whenever a network device receives a message having a multicast destination MAC address, the network device can look up the message's destination MAC address in a bridge table maintained by that network device. If the entry that includes the destination MAC address is found in the bridge table, the network device forwards the message via the interfaces and VLAN associated with that MAC address in the bridge table. Otherwise, the network device floods the message via all of its interfaces in the VLAN in question (other than the interface via which the message was received).

In many implementations of network 100, the encapsulation of messages being sent from the customer equipment (e.g., multicast router 104(2)) into network 100 is standardized. Accordingly, information identifying a message as join message is located at a standard offset within the join message, making it relatively easy for edge devices 110(1)-110(3) to detect that the message is a join message. In contrast, the encapsulation used within network 100 can result in the information identifying a join message being located at a variable offset within the message. This can in turn make it necessary to include additional functionality in devices such as core devices 112(1)-112(3) (and/or to allow for additional processing time at such devices) if it is desired that these devices be able to detect join messages. In contrast, detection of the companion messages can be performed with little or no modification of devices such as core devices 112(1)-112(3). Accordingly, by detecting join messages as the join messages enter network 100 and then generating companion messages, edge devices 110(1)-110(3) can provide proxy snooping for core devices 112(1)-112(3) and other edge devices. This can reduce the need for additional functionality within the core devices in order for the core devices to be able to learn multicast addresses (e.g., by being able to allocate bridge table entries to multicast addresses).

In some embodiments, edge devices 110(1)-110(3) and core devices 112(1)-112(3) are configured to allocate bridge table entries to all multicast MAC addresses that are not included in the group of reserved MAC addresses used for management of network 100 and that do not correspond to well-known IP multicast addresses (such as those used for routing protocols). If a multicast MAC address is used to specify all edge devices, and if this MAC address is used as the destination address of each companion message, this multicast MAC address can also be excluded from the set of MAC addresses that edge devices 110(1)-110(3) and core devices 112(1)-112(3) are configured to allocate bridge table entries to. In one embodiment, edge devices 110(1)-110(3) and core devices 112(1)-112(3) are configured to only allocate bridge table entries to multicast addresses in a block of private multicast addresses that has been reserved for use by customers.

Since multicast addresses will be present in the bridge tables of each device in network 100, the overall number of MAC addresses a device needs to allocate bridge table entries to may increase (relative to the number of bridge table entries needed in systems that do not learn multicast addresses). This increases the amount of memory needed in each network device for use as a bridge table.

In some embodiments, each edge and core device counts the number of multicast addresses used by each customer at any given time. This allows the service provider to charge each customer for the amount of extra memory needed to support the customer's use of multicast functionality. For example, each edge and core device can count the number of multicast bridge table entries currently allocated for each VLAN. The service provider can retrieve this number and, based on the VLAN associated with each number, determine how many bridge table entries are being used for multicast addresses for each customer. In an alternative embodiment, the number of bridge table entries used for multicast is controlled by enabling each edge device 110(1)-110(3) to only generate companion messages for certain multicast addresses. For example, the service provider can determine whether a particular customer has subscribed to use the companion message service. If the customer has subscribed to use companion messages, the service provider can enable edge devices 110(1)-110(3) to generate companion messages for multicast addresses used by the subscribing customer. By controlling companion message generation, the number of multicast addresses that will be learned can be controlled. This in turns controls the number of bridge table entries used for multicast addresses. In one embodiment, a service provider charges customers based on whether companion message generation has been enabled for multicast addresses used by that customer and/or based on the number of multicast addresses for which companion message generation has been enabled.

In some embodiments, bridge tables within edge devices 110(1)-110(3) and core devices 112(1)-112(3) are implemented in which each entry needs to be periodically refreshed (i.e., entries can "age out" of the bridge tables if messages addressed to and/or from the corresponding addresses are not received within a given time period). In one embodiment, each multicast router periodically sends join messages (e.g., every 60 seconds) indicating the multicast groups that multicast router is joining and/or has already joined. In response to one of these join messages, an edge device can update its bridge table (e.g., if a new multicast group is specified in the join message or if a new interface should be associated with a multicast address that has already been associated with another interface). The edge device can then generate and send a corresponding companion message, which will in turn cause other devices in network 100 to refresh information for each multicast address in the companion message.

The loss of a companion message will have different effects depending on whether a bridge table entry has already been allocated to any multicast address included in that companion message by any of the devices in network 100. If no devices have allocated bridge table entries to any of the multicast addresses included in the lost companion message, all of the devices will treat messages addressed to those multicast addresses as unknown traffic. While flooding these messages may decrease the efficiency of network 100 and/or negatively affect slow connections to the EVC in which the messages are flooded, the messages will still be provided to multicast destination 106.

If some devices have already allocated bridge table entries to the multicast addresses and the companion message would refresh (but not modify) the information already associated with those multicast addresses in the bridge table entries, loss of the companion message will not have any effect (unless the loss of the companion messages causes the already-associated information to age out). If instead the multicast address would modify the information stored in a bridge table entry by a particular network device (e.g., by causing an additional interface to be associated with a particular multicast address), the loss of the companion message may result in a router that has joined a multicast flow not receiving the multicast flow until the particular network device receives an appropriate companion message. For example, if core device 112(1) has learned that a particular multicast flow should be forwarded to multicast router 104(2), and if a companion message (indicating the same multicast flow, but corresponding to a join message sent by router 108) is lost before reaching core device 112(1), core device 112(1) will not provide the multicast flow to router 108, even though router 108 has joined the multicast group. Accordingly, in some embodiments, this potential source of multicast delay is reduced by having edge devices 110(1)-110(3) send multiple copies of a companion message each time a join message specifying a multicast group with a previously-unlearned multicast address is received.

In some embodiments, if certain types of failures occur within network 100, all of the information associated with multicast addresses is flushed (e.g., by clearing the information stored in all bridge tables within network 100). This causes these network devices to flood multicast traffic after the information is flushed. In some such embodiments, edge devices 110(1)-110(3) track which multicast groups are currently active. If a failure occurs within network 100 that causes the bridge tables to be flushed, the edge devices send one or more companion messages corresponding to the active multicast groups and VLANs. For example, the edge devices can detect a spanning tree Protocol Data Unit (PDU) that indicates that such a failure occurred. In response to the spanning tree PDU, the edge devices can each generate one or more companion messages corresponding to active multicast groups and VLANs within network 100. In embodiments where none of edge devices 110(1)-110(3) track active multicast groups (and thus are unable to send companion messages after a failure is detected), multicast traffic will be flooded until the next time join messages are sent to edge devices 110(1)-110(3), which will cause edge devices 110(1)-110(3) to generate appropriate companion messages.

If multicast destination 106 leaves the multicast group, multicast destination 106 sends an IGMP leave to its local multicast router 104(2). If there are no other hosts connected to multicast router 104(2) that are interested in the multicast group, multicast router 104(2) responds to the IGMP leave message by sending a leave message to multicast router 104(1) via edge device 110(2). In some embodiments, such as those using PIM as a Layer 3 multicast routing protocol, a leave message is the same type of message as a join message. A flag associated with each multicast group indicates whether the multicast group is being joined or left. If a join message indicates that a multicast group is being left, edge device 110(2) will not send a companion frame containing the multicast address of that multicast group (or the companion frame that is sent will not specify the multicast address of that multicast). As a result, any bridge table entries within edge devices 110(1)-110(3) and core devices 112(1)-112(3) that maintain an association between the multicast address and an interface leading towards multicast router 104(2) will eventually time out (unless another customer edge device coupled to edge device 110(2) continues to be interested in receiving that multicast group, as evidenced in join messages sent by the other customer edge device). In some embodiments, it may take several minutes for the bridge table entries to time out after multicast router 104(2) sends the join message indicating that router 104(2) is leaving the multicast group. During that time, edge device 110(2) can drop any multicast messages sent to that multicast group so that multicast router 104(2) will not receive those multicast messages. In such an embodiment, edge device 110(2) maintains information identifying which of the multicast routers attached to edge device 110(2) are interested in each multicast group. Edge device 110(2) uses this information to determine whether to forward a multicast message addressed to a particular multicast group to each of the multicast routers (e.g., if all but one of the multicast routers attached to edge device 110(2) have left the multicast group, edge device 110(2) will only forward the multicast message to the interested multicast router, even if the bridge table entry allocated to the multicast address identifies additional multicast routers).

In some embodiments, fewer than all devices within network 100 allocate bridge table entries to multicast addresses and/or support companion messages. For example, in one embodiment, core devices 112(1) and 112(2) are configured to allocate bridge table entries to multicast addresses in response to receiving companion messages, but core device 112(3) is not configured to perform these functions. In such an embodiment, core device 112(3) will ignore companion messages generated by other devices. Core device 112(3) will also flood any multicast messages received by core device 112(3). In such a situation, the network may be less efficient than if all core devices 112(1)-112(3) allocated bridge table entries in response to receiving companion messages, but multicast messages will still reach the appropriate destinations.

It is noted that in order to be able to provide a customer with a multicast flow, each edge device 110(1)-110(3) needs to be able to generate companion messages. If, for example, edge device 110(3) cannot generate companion messages, edge device 110(3) may not be able to provide a multicast flow to router 108 if edge device 110(2) has also generated a companion message for that multicast flow. In this situation, any core devices 112(1)-112(3) that receive the companion message generated by edge device 110(2) will associate the multicast address of messages in that multicast flow is associated with an interface leading towards edge device 110(2) and the VLAN specified in the companion message. As a result, those core devices will stop flooding messages included in that multicast flow and begin sending those messages via the interface leading towards edge device 110(2) in the specified VLAN. If the multicast flow is not being flooded, edge device 110(3) may not receive the multicast flow, even if router 108 has sent a join message to multicast router 104(1). Thus, in some embodiments, all edge devices that are coupled to customers who wish to be able to receive multicast flows are enabled to generate companion messages.

It is noted that in at least some embodiments, the use of companion messages within network 100 is transparent to the customers that use network 100. For example, in many embodiments, no modifications to the customer's equipment or to the Layer 3 routing protocol are needed in order to be able to use companion messages within network 100.

Figure 3:
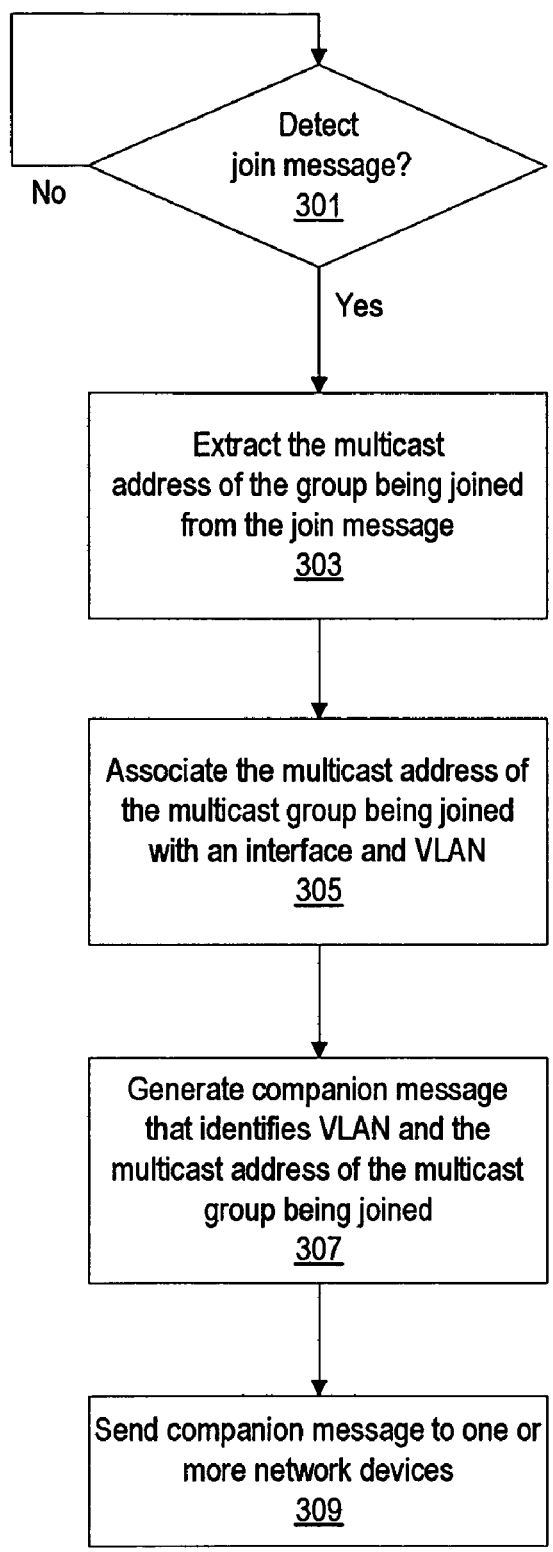
FIG. 3 is a flowchart of a method of generating companion messages, according to one embodiment of the present invention.

FIG. 3 is a flowchart of a method of generating companion messages. This method can be performed by an edge device, such as edge devices 110(1)-110(3) of FIG. 1. Join messages, which are sent as part of a Layer 3 routing protocol such as PIM, are detected as the join messages enter a network, as shown at 301. The network is a Metro Ethernet Network in some embodiments. Detecting join messages can involve snooping incoming messages for PIM join messages in some embodiments. These messages can be detected by searching each incoming message for information (e.g., such as a message type field) identifying that message as a join message.

If a join message is detected at 301, the multicast address (or addresses) of the multicast group (or groups) being joined is extracted from the join message, as shown at 303. In some Layer 3 routing protocols, such as PIM-SM, routers use the same type of join message to both leave and join a multicast group (and a single message of this type can be used to join one multicast group and to leave another multicast group). A flag (e.g., a bit) within the join message can indicate whether the router sending the message is requesting to leave or join a particular multicast group. If multiple multicast groups are specified within the join message, the join message can include one flag per multicast group. In such embodiments, extracting the multicast address of a group being joined can involve parsing the join message for multicast addresses (or other information specifying a multicast group) and then using a flag associated with each multicast address to determine whether that multicast group is being joined. The identified multicast address(es) can then be extracted.

At 305, the multicast address of each multicast group being joined is associated with an interface and VLAN. This can involve converting a multicast IP address specified in the join message to a corresponding multicast MAC address and allocating an entry for the multicast MAC address in a bridge table. The multicast MAC address can be associated with the interface and EVC via which the join message is received. If the join message is being conveyed in a particular EVC (e.g., as indicated by a field within the join message), learning the multicast address can also involve associating the VLAN used to identify the EVC within network 100 with the multicast address. For example, the bridge table entry allocated to the multicast address can also store a VLAN identifier. If the join message is being used to join multiple multicast groups, functions 303 and 305 can be repeated (or performed in parallel) for each multicast group being joined.

A companion message is generated in response to the join message, as shown at 307. The companion message is then sent to one or more devices within the network, as shown at 309. In some embodiments, the companion message is sent via the data path (e.g., the companion message can be sent via the same data path as the join message to which the companion message corresponds). In other embodiments, the companion message is sent via a dedicated management network that connects the devices in the network.

The companion message generated at 307 includes the multicast address of a multicast group being joined by the join message. The companion message can also include a tag (e.g., an 802.1Q tag) identifying the VLAN in which the companion message is to be conveyed within the network. If the companion message is being sent via the same VLAN as the corresponding join message, this VLAN identifier also identifies the VLAN in which multicast messages addressed to the multicast address should be conveyed. If the companion message is being sent in a different VLAN than the corresponding join message, the companion message can also include the VLAN identifier of the VLAN in which the join message is conveyed (e.g., this VLAN identifier can be included in the data field of the companion message). In some embodiments, the companion message also includes information that is indicative of which interface each recipient device should associate with the multicast address (e.g., if the companion message will be received via a different interface than the interface with which the multicast address should be associated).

As noted above, the destination address of the companion message can be specified in a variety of different ways. For example, in one embodiment, a reserved multicast address used to identify all PIM routers is used as the destination address of the companion message. A reserved multicast address used to identify all edge devices in the network can also be used as the destination address of the companion message. In another embodiment, a broadcast destination address is used, causing the companion message to be sent to all devices within the network. In still other embodiments, the companion message is addressed to the multicast source (or sources) of the multicast group. The companion message could alternatively be addressed to the edge devices coupled to each multicast source. In situations in which a companion message has multiple destinations, unicast destination addresses can be used, and one copy of the companion message can be sent to each of the destinations. Alternatively, multicast addresses (e.g., selected from a set of reserved multicast addresses used internally within the network) and/or broadcast addresses can be used to address a single copy of the companion message to multiple recipients.

In one embodiment, a single companion message is generated in response to a join message, regardless of the number of multicast groups being joined by the join message. In this embodiment, the multicast addresses of the multicast groups being joined are included in a data field of the companion message. These multicast addresses can be specified as IP addresses (e.g., copied directly from the join message) or as MAC addresses (e.g., after converting IP addresses specified in the join message to MAC addresses).

In some embodiments, if more than one multicast group is being joined in the join message, a different companion message is generated for each multicast group being joined. In such embodiments, function 307 is repeated for each multicast group being joined in the join message. In these embodiments, each companion message includes the multicast address of a corresponding multicast group. The corresponding multicast address can be included as the source address of the companion message. Alternatively, the corresponding multicast address can be included in the data field of the companion message.

Figure 4:
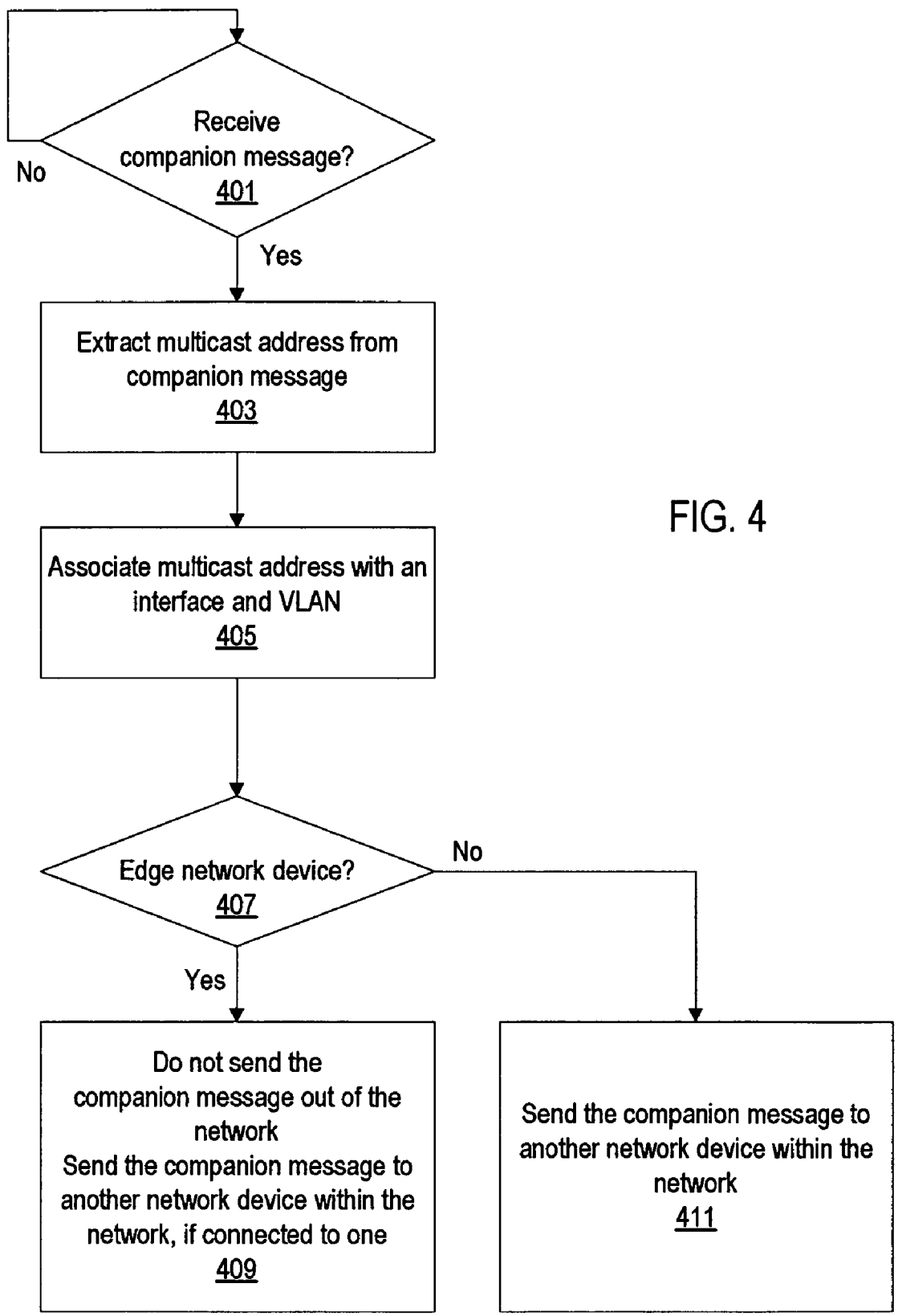
FIG. 4 is a flowchart of a method of responding to a companion message by associating an interface and VLAN with a multicast address, according to one embodiment of the present invention.

FIG. 4 is a flowchart of a method of responding to a companion message. This method can be performed by a network device, such as one of edge devices 110(1)-110(3) or core devices 112(1)-112(3) of FIG. 1, that receives a companion message generated by an edge device.

If a companion message is received, as determined at 401, a multicast address within the companion message is extracted, as shown at 403. Detecting a companion message can involve detecting a certain value of a message type field in one embodiment. Extracting the multicast address within the companion message can involve extracting the source address of the companion message in some embodiments (i.e., in these embodiments, the source address is the multicast address).

In other embodiments, extracting the multicast address within the companion message involves parsing the companion message. For example, upon detecting a companion message, the companion message can be passed to a specialized companion message handler (e.g., a software routine or specialized hardware) that parses the companion message for multicast addresses. One or more multicast addresses can be included in a data field of the companion message, and thus more than one multicast address can be extracted from each companion message. If the multicast address (or addresses) included in the companion message is specified as a multicast IP address, the multicast IP address can be converted to an appropriate multicast MAC address.

Once a multicast address within the companion message is extracted, the device that received the companion message associates the multicast address with an interface and/or VLAN. Learning the multicast address can involve allocating an entry to the multicast address in a bridge table. The allocated entry can include the multicast address detected within the companion message and information identifying the interface (or interfaces) and VLAN with which the multicast address is associated. These interfaces each lead towards one of the devices in the multicast group identified by the multicast address.

The information identifying the interface with which the multicast address is associated can be obtained based on which of the device's interfaces received the companion message. For example, if the device receives the companion message via a particular interface, an ID associated with that interface can be stored in the bridge table entry allocated to the multicast address.

The allocated entry can also include information indicating the VLAN associated with the multicast address. This information can be obtained by identifying the VLAN in which the companion message is received. In one embodiment, this information can be obtained from a VLAN tag (e.g., an 802.1Q tag) included in the companion message.

If an entry has already been allocated to the multicast address, information within that entry can be updated and/or refreshed in response to the companion message. For example, in response to another earlier-received companion message, the device can have learned that the multicast address is associated with interface A and VLAN X by allocating an entry to the multicast address in a bridge table. In response to receiving the companion message at 401, the device can learn that the same multicast address is also associated with interface B and VLAN X by adding information identifying interface B and VLAN X to the bridge table entry that is already allocated to the multicast address.

If the device that received the companion message is an edge device, the device does not forward the companion message out of the network, as shown at 407-409 (e.g., the edge device can drop the companion message instead). For example, even if the companion message is addressed to a customer's router that is connected to the network by the edge device, the edge device will not send the companion message out of the network to the router. However, the edge device can forward the companion message to other devices within the network. If the device handling the companion message is not an edge device, the device forwards the companion message on to another device within the network, as shown at 407 and 411.

Figure 5:
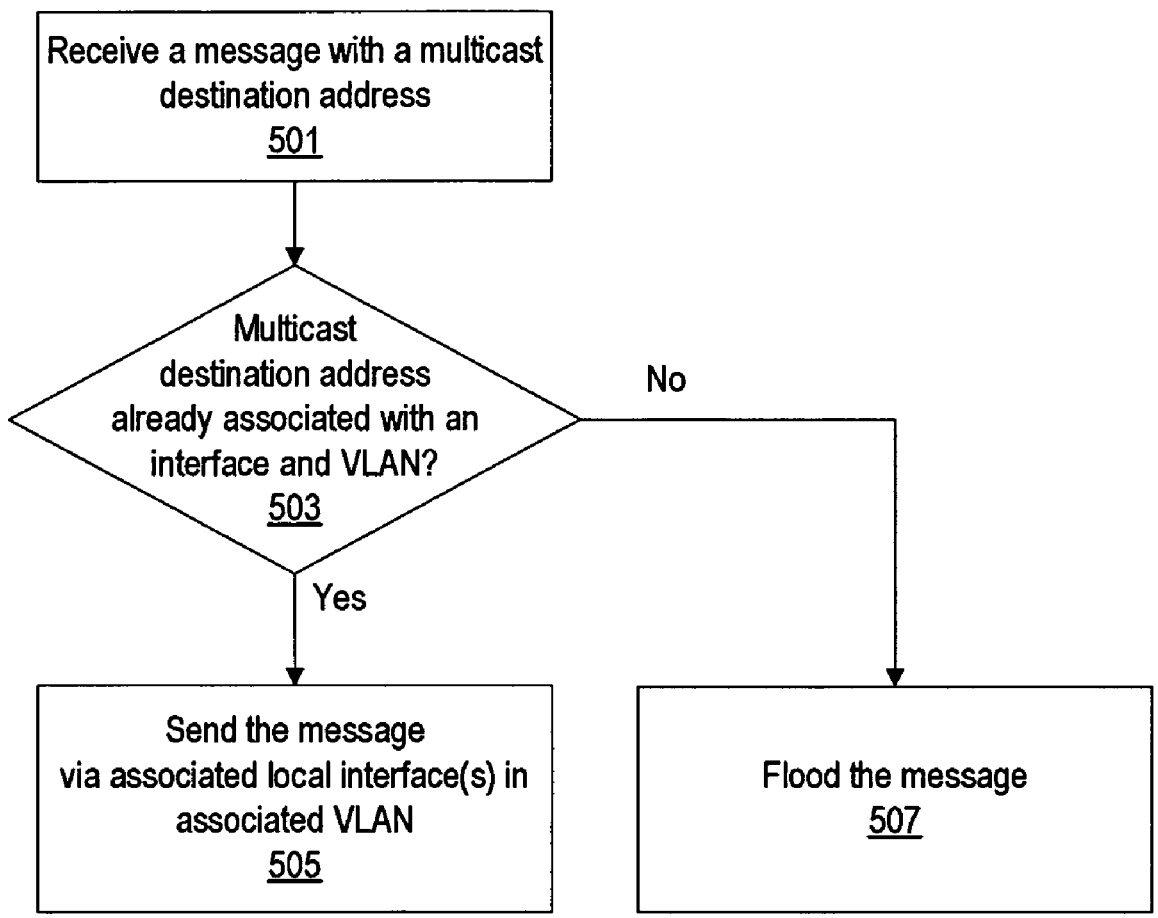
FIG. 5 shows how a multicast can be handled if the multicast address has been associated with a particular interface or interfaces and VLAN, according to one embodiment of the present invention.

FIG. 5 shows how a message with a multicast destination address can be handled in a system, such as network 100 of FIG. 1, that uses companion messages. At 501, a message with a multicast destination address is received by a device. If the device has already associated the multicast destination address with an interface VLAN, as determined at 503, the device sends the message via one or more interfaces that are associated with the multicast destination address and VLAN, as shown at 505. Otherwise, if the device has not yet associated the multicast destination address with any interfaces, the device floods the message via all interfaces in the incoming VLAN (except for the interface via which the message was received).

Determining whether the device has already associated the multicast destination address with an interface and VLAN can involve comparing the multicast destination address and VLAN to values in a bridge table. If an entry matching the multicast destination address and VLAN is found within the bridge table, information included in the matching entry can then be used to forward the message. For example, if the matching entry indicates that the multicast address and VLAN are associated with two interfaces, the message can be sent via those two interfaces and VLAN. For example, if the incoming VLAN in which the message is received is not the same as the VLAN of an interface identified in the bridge table, the message will not be sent via that interface.

Figure 6A:
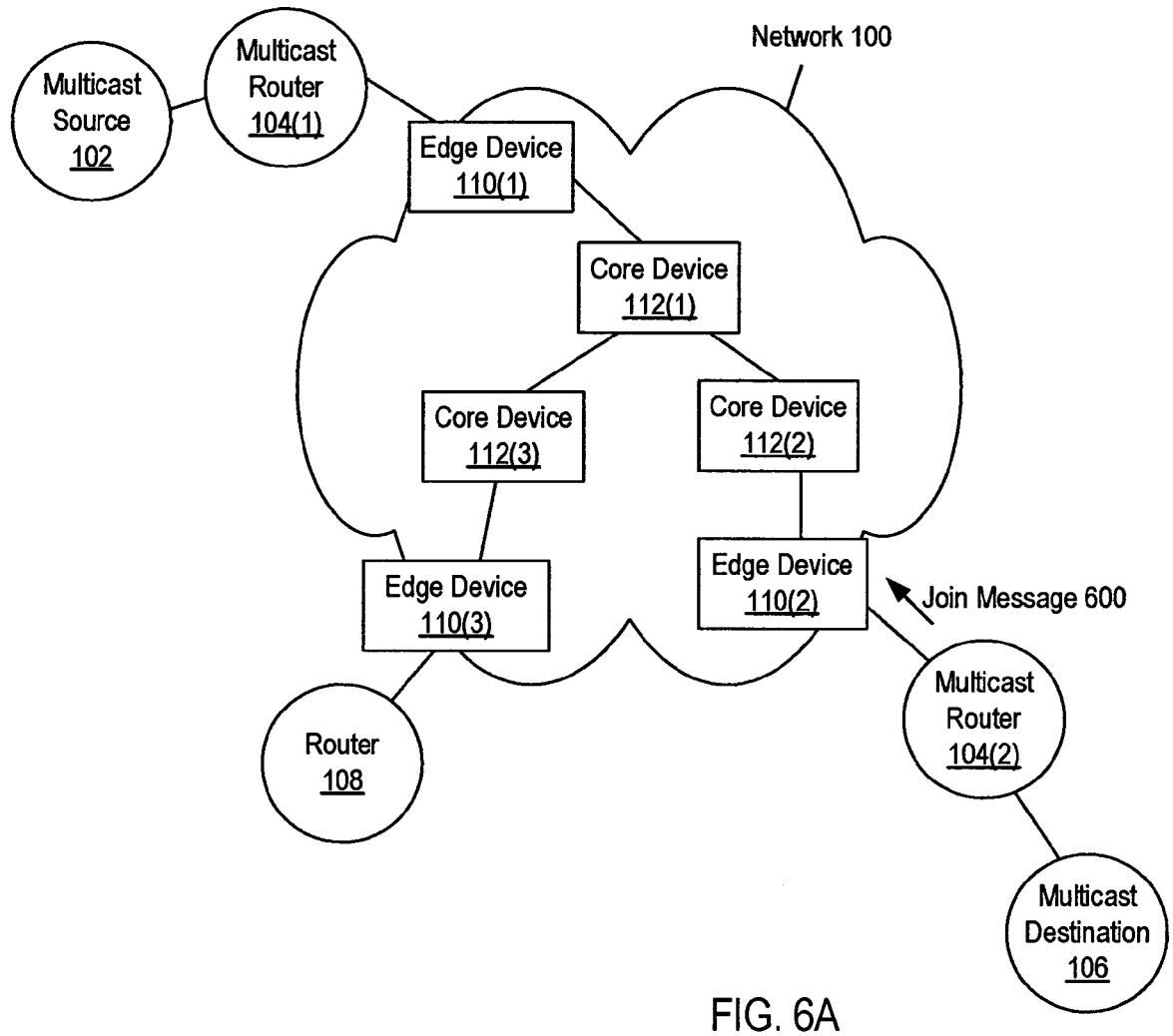
FIGS. 6A-6C provide an example of how and where companion messages are generated and how different switches can handle companion messages, according to one embodiment of the present invention.
Figure 6B:
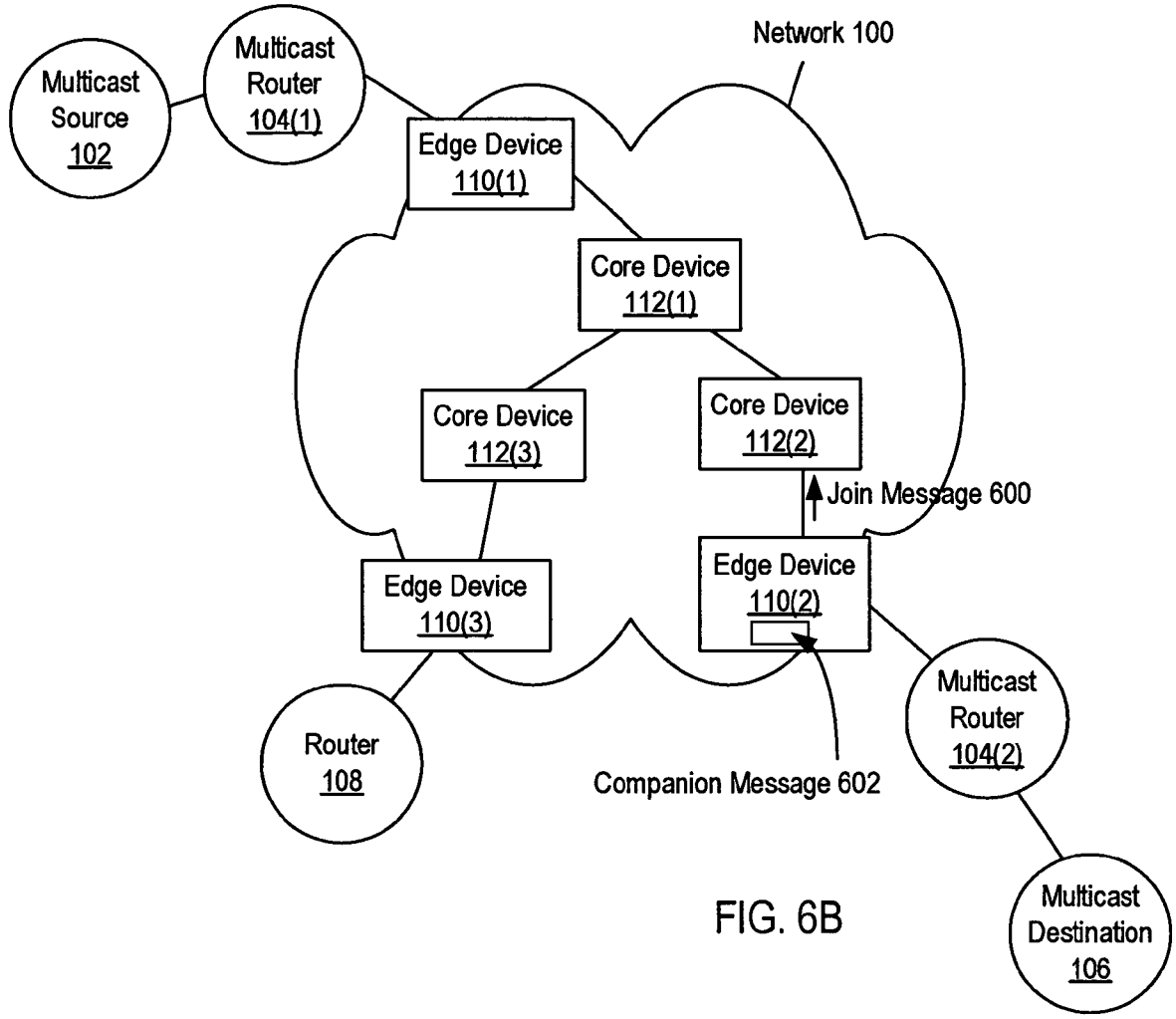
Figure 6C:
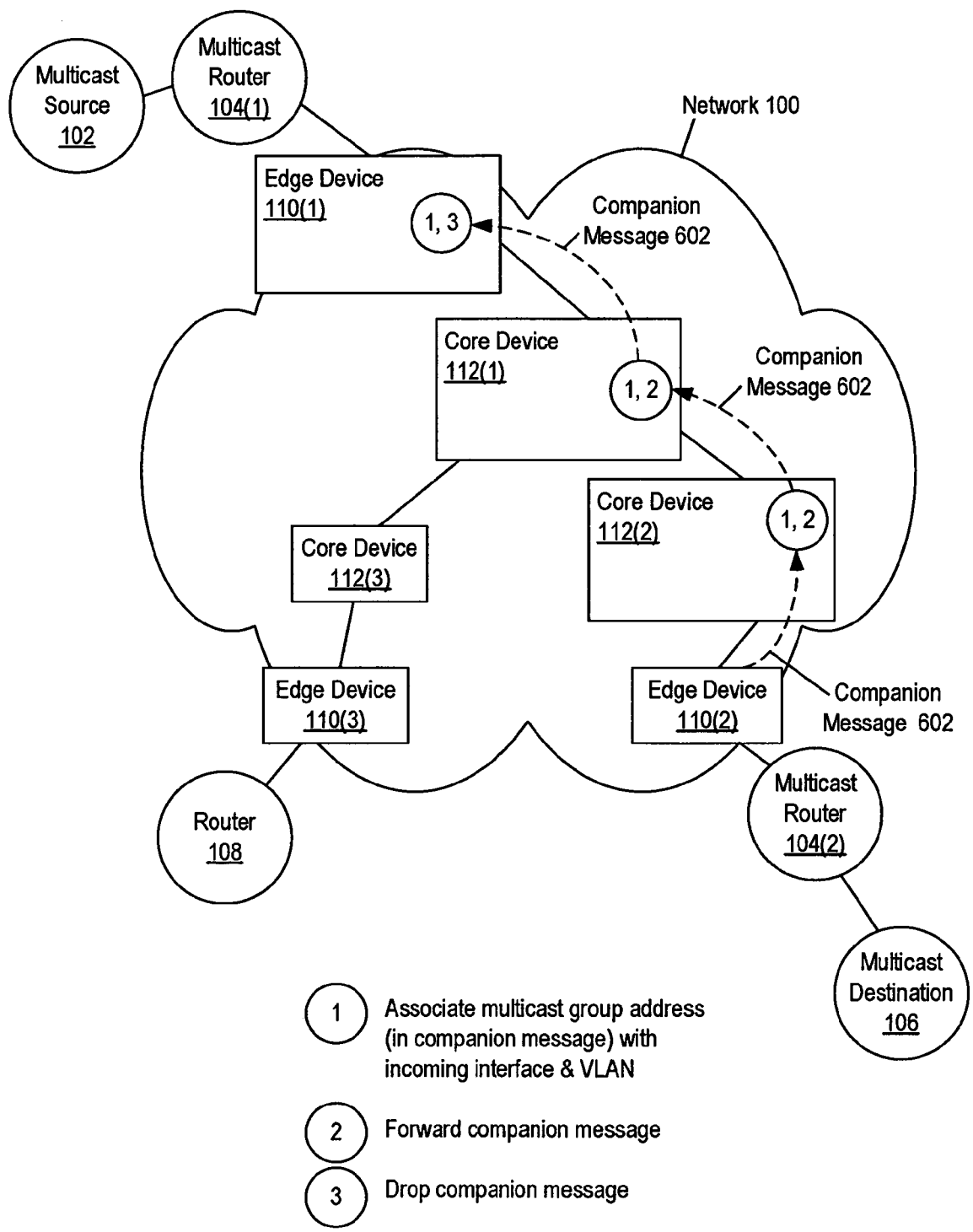

FIGS. 6A-6C provide an example of how and where companion messages are generated and how different devices can handle companion messages, according to one embodiment of the present invention. In this example, network 100 is a Metro Ethernet Network that includes several devices that each perform Ethernet switching. Before any companion messages have been generated within network 100, edge devices 110(1)-110(3) and core devices 112(1)-112(3) will flood all messages having multicast destination addresses. As multicast addresses are associated with interfaces and VLANs in response to companion messages, multicast messages will cease being flooded.

FIG. 6A shows join message 600 being sent to an edge device by multicast router 104(2), which is participating in a Layer 3 multicast protocol, such as PIM, with multicast router 104(1). Join message 600 indicates that router 104(2) is joining a multicast group. Join message 600 includes information, such as an IP multicast address, identifying the multicast group being joined. It is noted that join message 600 can also include information identifying other multicast groups that router 104(2) is joining and/or information identifying multicast groups that router 104(2) is leaving.

As shown in FIG. 6B, edge device 110(2) receives and forwards join message 600. Edge device 110(2) forwards join message 600 normally based on its addressing information, just as any other message would be forwarded. In response to receiving join message 600, edge device 110(2) associates the multicast address of the multicast group identified in join message 600 with an interface and VLAN. For example, edge device 110(2) associates the multicast address with an interface by allocating a bridge table entry that associates the multicast address with the interface leading towards multicast router 104(2), which is the interface via which edge device 110(2) received join message 600. If an entry has already been allocated to the multicast address, the existing entry can be updated to indicate that the multicast address is associated with the interface leading towards multicast router 104(2) (the existing entry can already include associations with other interfaces (not shown) of edge device 110(2)). Edge device 110(2) can also store information identifying a VLAN (e.g., the VLAN used to identify the EVC in which join message 600 is received) in the bridge table entry.

In additional to associating the multicast address included in join message 600 with an interface and VLAN, edge device 110(2) generates a companion message 602 that corresponds to the join message. Companion message 602 includes the multicast address of the multicast group identified in join message 600. The multicast address is used as the source address of companion message 602 in some embodiments. In other embodiments, the multicast address is included in the data field of companion message 602. Companion message 602 can also include information (e.g., in an IEEE 802.1Q tag) identifying the VLAN in which companion message 602 is being conveyed.

FIG. 6C shows how the other devices react to companion message 602. Edge device 110(2) sends companion message 602 to at least some of the other devices in network 100. In this example, companion message 602 is sent via the path shown in dashed lines. It is noted that in other embodiments, companion message 602 can also be sent to other devices, such as core switch 112(3) and edge device 110(3) within network 100 (e.g., companion message 602 can be broadcast throughout network 100 or throughout an EVC within network 100). In this example, companion message 602 is sent via the normal data path (as opposed to being sent in a management network or management VLAN).

The first device to receive companion message 602 from edge device 110(2) is core device 112(2). In response to receiving companion message 602, core device 112(2) associates the multicast address indicated in the companion message with an interface and VLAN. In this example, core device 112(2) associates the multicast address with the interface via which the companion message is received (i.e., the interface leading towards edge device 110(2) and, in turn, multicast router 106(2)). Core device 112(2) can also associate the multicast address with the VLAN in which companion message is being conveyed (e.g., based on an IEEE 802.1Q tag included in the companion message).

Core device 112(2) forwards companion message 602 to core device 112(1). In response to receiving companion message 602, core device 112(1) associates the multicast address with an interface. Here, core device 112(1) associates the multicast address with the interface that leads to core device 112(2), which in turn ultimately leads to multicast router 106(2). Core device 112(1) also associates the multicast address with the VLAN in which the companion message is being conveyed. Core device 112(1) then forwards the companion message on to its next destination.

In response to receiving companion message 602 from core device 112(1), edge device 110(1) associates the multicast address included in the companion message with an interface and VLAN. Rather than send the companion message out of network 100, edge device 110(1) then causes companion message 602 to be dropped.

Figure 7:
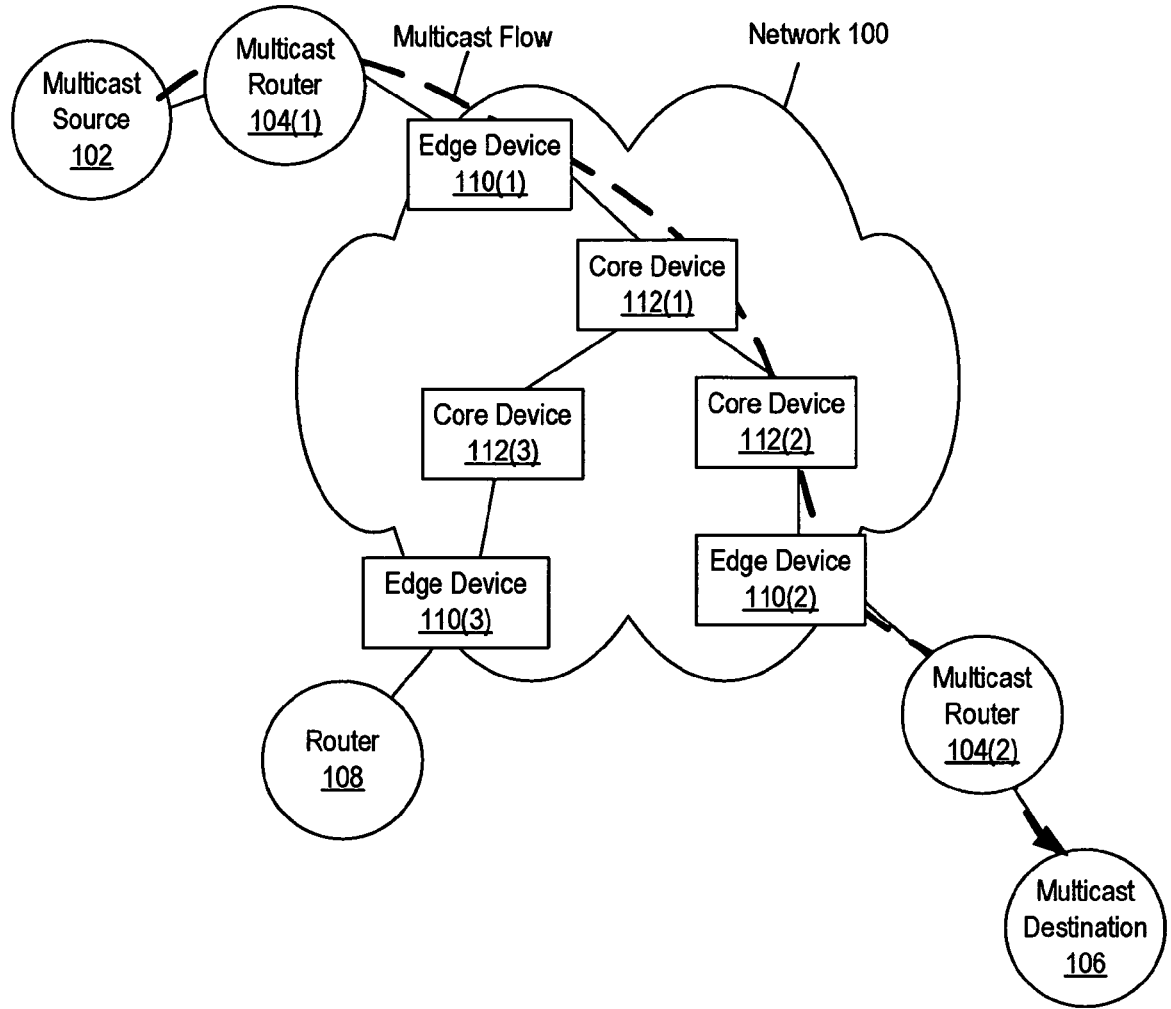
FIG. 7 shows how multicast messages flow through the network of FIGS. 5A-5C after the companion message has made its way through the network.

FIG. 7 shows how multicast messages flow through the network after the companion message has made its way through the network. As shown, instead of being flooded, multicast messages entering network 100 via edge device 110(1) are sent via the path that leads to multicast router 104(2). In particular, edge device 110(1) sends each multicast message addressed to the multicast address via the interface leading to core device 112(1) instead of flooding the multicast message. Similarly, core device 112(1) sends the multicast message via the interface leading to core device 112(2) instead of flooding the multicast message from all interfaces. In turn, edge device 112(2) sends the multicast message via the interface leading to edge device 110(2), and edge device 110(2) sends the message to multicast router 104(2). Accordingly, customer devices, such as router 108, that have not joined the multicast group do not receive multicast messages addressed to that multicast group.

Figure 8:
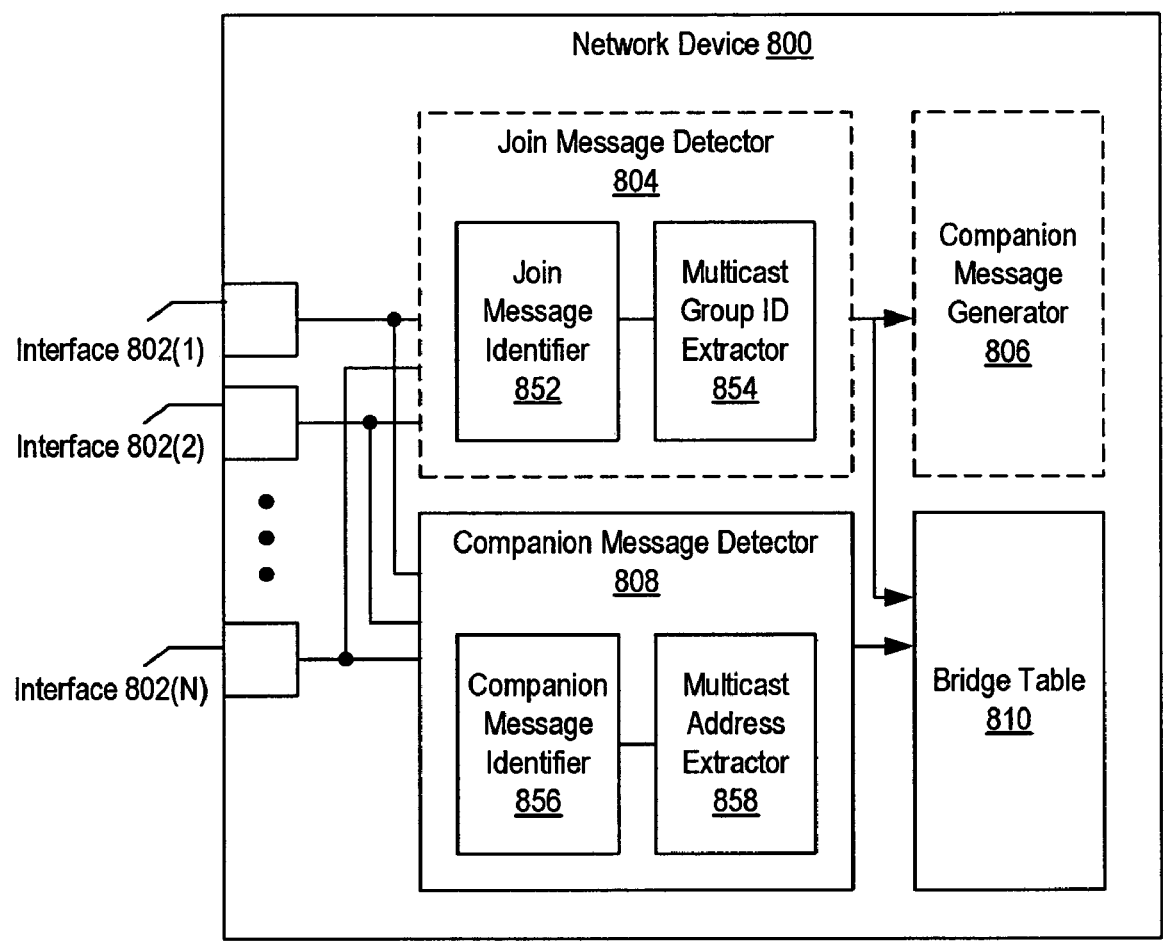
FIG. 8 is a block diagram of a network device that can be used in a network that supports companion messages, according to one embodiment of the present invention.

FIG. 8 illustrates an example of a network device 800 that can be included in network 100 of FIG. 1. In this example, network device 800 can be an edge device or core device in a Metro Ethernet Network. Network device 800 can perform Layer 2 Ethernet switching. Network device 800 includes several interfaces 802(1)-802(N). Each interface 802(1)-802(N) can send and/or receive messages. Each interface 802(1)-802(N) can be coupled to another network device within the Metro Ethernet Network or, if network device 800 is an edge device, to customer equipment such as a router.

If network device 800 is an edge device, network device 800 includes join message detector 804 and companion message generator 806. Join message detector 804 detects each Layer 3 multicast protocol join message that is received via one of interfaces 802(1)-802(N) among those attached to customer equipment. In particular, join message detector 804 can include a join message identifier 852 that identifies join messages (e.g., based on a message type field) included in a message stream received via interfaces 802(1)-802(N). Join message detector 804 can also include multicast group identifier (ID) extractor 854, which operates to extract information (e.g., an IP multicast address) identifying a multicast group from a join message identified by join message identifier 852.

In response to detecting a join message, join message detector 804 notifies companion message generator 806, which then generates (e.g., the join message detector can interact with the companion message generator to perform the method shown in FIG. 2) one more companion messages that correspond to the join message. Companion message generator 806 then causes the companion message to be sent into the Metro Ethernet Network via one or more of interfaces 802(1)-802(N) among those not attached to customer equipment.

It is noted that join message detector 804 and/or companion message generator 806 can be selectively enabled or disabled by the service provider that operates the Metro Ethernet Network in which network device 800 is included. For example, if network device 800 is being used as an edge device in an EVC, the service provider can selectively enable join message detector 804 and/or companion message generator 806 based on whether the customer using that EVC has requested the use of the companion message service. If join message detector 804 or companion message generator 806 is disabled, network device 800 will not generate companion messages.

Network device 800 also includes companion message detector 808 and bridge table 810. Bridge table 810 can be implemented using various storage devices, such as a CAM. Companion message detector 808 detects each companion message received into network device 800 via one of interfaces 802(1)-802(N) among those not attached to customer equipment. As shown, companion message detector 808 can include companion message identifier 856, which identifies companion messages in a message stream received via interfaces 802(1)-802(N) among those not attached to customer equipment. For example, companion message identifier 856 can detect whether a message type field of a given message has a value that identifies the message as a companion message. Companion message detector 808 can also include multicast address extractor 858, which extracts a multicast address from a companion message identified by companion message identifier 856.

In response to detecting a companion message, companion message detector 808 causes bridge table 810 to allocate an entry to a multicast address included in the companion message (or to update an entry, if an entry has already been allocated to that multicast address). Companion message detector 808 can also implement other functionality described above (e.g., such as counting the number of bridge table entries allocated per customer and/or verifying whether a multicast address is within a particular set of multicast addresses before causing bridge table 810 to allocate an entry to that multicast address).

Bridge table 810 stores information associating the multicast address with one or more interfaces and/or a VLAN (e.g., the companion message detector can interact with the bridge table to perform the method shown in FIG. 3). In embodiments in which device 800 is an edge device, join message 804 can also cause bridge table 810 to allocate an entry to a multicast address in response to detecting a join message.

Figure 9:
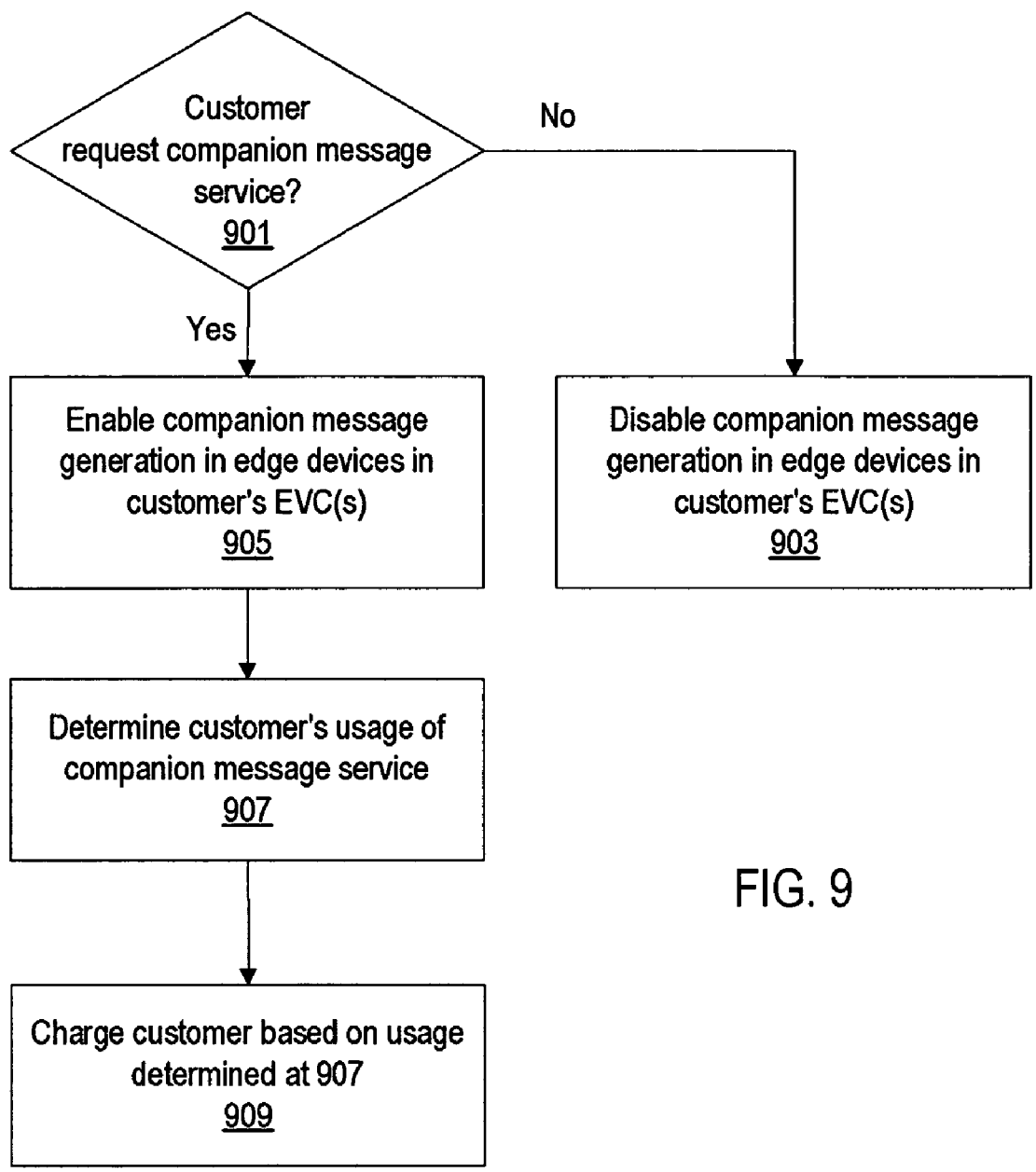
FIG. 9 illustrates how a service provider can use a network that supports companion messages to provide multicast services to a customer, according to one embodiment.

FIG. 9 is a flowchart of a method that a service provider can use to provide multicast service to a customer within a Metro Ethernet Network, according to one embodiment of the present invention. In this embodiment, the service provider charges for the use of companion messages. The amount charged can be either a flat rate or a variable rate related to the amount of storage used for bridge table entries for multicast addresses for a given customer. Additionally, in order to encourage customers to pay for the use of the companion message service, the service provider may prevent customers that have not paid for the use of companion messages from receiving the benefits that can arise when companion messages are used. Accordingly, if a customer does not subscribe to the companion message service, multicast messages will be flooded in the EVC (or EVCs) used by that customer.

If a customer has not requested companion message service, the service provider can disable companion message generation in edge devices that are included in the EVC (or EVCs) used by that customer, as shown at 901-903. As a result, no bridge table entries will be allocated for multicast groups joined by that customer. This prevents the customer from taking up additional bridge table entries, which are a relatively expensive resource, for multicast addresses without paying for the service. If one of the customer's routers does join any multicast groups, multicast messages sent to that group will be flooded in the customer's EVC, and thus the customer will not benefit from the use of companion messages.

If a customer has requested companion message service, the service provider enables companion message generation in edge devices that are included in the EVC (or EVCs) used by that customer, as shown at 901 and 905. Accordingly, if one of the customer's routers joins a multicast group, network devices within the customer's EVC will allocate bridge table entries to the multicast address of that multicast group. As a result, multicast traffic addressed to that multicast group will not be flooded within the customer's EVC.

The service provider can also determine the customer's usage of the companion message service, as shown at 907. In one embodiment (e.g., where a flat rate is charged for the use of the companion message service), determining the customer's usage can involve simply determining whether companion message generation is currently enabled in that customer's EVC. For example, the service provider can determine whether edge devices have been enabled to generate companion messages for a set of multicast addresses used by the customer. The service provider can also determine the number of multicast addresses for which companion message generation has been enabled. Alternatively, determining the customer's usage can involve counting the number of bridge table entries (e.g., within one or more network devices within the Metro Ethernet Network) that have been allocated in response to the customer joining multicast groups. At 909, the customer can then be charged based on the usage determined at 907. Charging the customer can involve calculating an amount owed by that customer for the customer's usage of the companion message service. The amount owed for the use of the companion message service can then be included (e.g., either as an individual charge or as part of a total charge for all Metro Ethernet Network services) in an invoice sent to the customer.

It is noted that in alternative embodiments, a service provider provides companion message service to all customers. However, the service provider can still determine each customer's multicast usage (e.g., by tracking the number of bridge table entries allocated for each customer) and charge each customer based on that customer's usage. In such an embodiment, this functionality (e.g., as shown at 907 and 909 of FIG. 9) can be performed by billing software executing on a host computer system coupled to the Metro Ethernet Network.

It is noted that the program instructions executable to generate and/or handle companion messages can be stored on various computer readable media such as a memory (e.g., RAM (Random Access Memory)). For example, in FIG. 1, each edge device 110(1)-110(3) can include software and data configured to generate companion messages as well as to extract and learn multicast addresses in response to detecting the reception of companion messages generated by other edge devices. Each core device 110(1)-110(3) can include software configured to extract multicast addresses from companion messages generated by edge devices 110(1)-110(3). In some embodiments, join message detector 804 and/or companion message detector 808, as shown in FIG. 8, are implemented in software.

In some embodiments, such software is stored on a computer readable storage medium such as a CD (Compact Disc), DVD (Digital Versatile Disc), hard disk, optical disk, tape device, floppy disk, and the like). In order be executed, the software is loaded into memory from another computer readable storage medium. The instructions and/or data can also be transferred to a computing device for storage in memory via a network such as the Internet or upon a carrier medium such as a network and/or a wireless link upon which signals such as electrical, electromagnetic, or digital signals, on which the data and/or instructions are conveyed.

Although the present invention has been described with respect to specific embodiments thereof, various changes and modifications may be suggested to one skilled in the art. It is intended such changes and modifications fall within the scope of the appended claims.

What is claimed is:

1. A method comprising:
receiving a companion message at a network device, wherein the companion message comprises a multicast address, wherein the companion message is generated by an edge device in response to the edge device receiving a join message of a Layer 3 multicast protocol from a router, and wherein the edge device is an Ethernet switch; and
extracting the multicast address in response to the receiving the companion message.

2. The method of claim 1, further comprising:
associating the multicast address with an interface of the network device, wherein the interface is coupled to a source of the join message; and
associating the multicast address with a VLAN (Virtual Local Area Network).

3. The method of claim 2, wherein the receiving the companion message comprises:
receiving the companion message via the interface.

4. The method of claim 3, wherein
the multicast address is a source address of the companion message.

5. The method of claim 3, wherein
the companion message is not forwarded if the network device is located at an edge of a network.

6. The method of claim 3, wherein
the network device is an Ethernet switch.

7. The method of claim 6, further comprising:
receiving an Ethernet message comprising a multicast destination address;
sending the Ethernet message via the interface if the multicast destination address is the multicast address; and
flooding the Ethernet message via a plurality of interfaces if the multicast destination address is not the multicast address.

8. The method of claim 6, further comprising:
receiving a second companion message via a second interface of the network device, wherein
the second companion message comprises the multicast address; and
associating the multicast address with the second interface.

9. The method of claim 8, further comprising:
receiving an Ethernet message comprising a multicast destination address;
sending the Ethernet message via the interface and the second interface if the multicast destination address is the multicast address; and
flooding the Ethernet message if the multicast destination address is not the multicast address.

10. The method of claim 3, wherein
the companion message comprises a plurality of multicast addresses, and the method further comprises:
associating each of the multicast addresses with the interface.

11. The method of claim 3, further comprising:
determining whether the multicast address is within a set of reserved multicast addresses, wherein
the set of reserved multicast addresses is reserved for customer use, and multicast addresses not included in the set of reserved multicast addresses are not associated with any interfaces.

12. The method of claim 3, further comprising:
counting a number of multicast addresses for which associations have been stored for a given customer at a given time.

13. The method of claim 1, wherein:
extracting the multicast address comprises parsing the companion message, wherein
a data field of the companion message comprises the multicast address.

14. The method of claim 1, further comprising:
sending the companion message via one or more interfaces.

15. The method of claim 7, wherein
the companion message comprises a destination address,
the destination address is an address of a first router coupled to a multicast source, and
the multicast source is configured to generate multicast traffic addressed to the multicast address.

16. The method of claim 14, wherein
the companion message comprises a destination address, and
the destination address is a multicast address associated with one or more edge devices.

17. The method of claim 14, wherein
the companion message comprises a destination address, and
the destination address is an address of a first edge device, the first edge device coupled to a first router coupled to a multicast source.

18. The method of claim 14, wherein
the companion message is sent via a management VLAN.

19. The method of claim 14, wherein
the companion message is sent via a data network in which the join message is being conveyed.

20. The method of claim 14, wherein
the companion message is sent via a management data network.

21. A method comprising:
receiving a join message of a Layer 3 multicast protocol from a router, wherein
the join message identifies a multicast group being joined; and
generating a companion message corresponding to the join message in response to the receiving the join message, wherein
the companion message comprises an address of the multicast group, and
the receiving and the generating are performed by an Ethernet switch.

22. The method of claim 21, wherein
the multicast address is a source address of the companion message.

23. The method of claim 22, wherein
the companion message comprises a destination address,
the destination address is an address of a first router coupled to a multicast source, and
the multicast source is configured to generate multicast traffic addressed to the multicast address.

24. The method of claim 22, further comprising:
generating a second companion message corresponding to the join message, wherein
the join message identifies a second multicast group being joined, and
the second companion message comprises a second multicast address of the second multicast group.

25. The method of claim 21, wherein
the join message identifies a plurality of multicast groups being joined, and
the companion message comprises a plurality of multicast addresses, each of the multicast addresses corresponding to one of the multicast groups.

26. A system comprising:
a companion message detector comprising:
a companion message identifier, wherein the companion message identifier is configured to identify a companion message, wherein the companion message is generated by an edge device in response to the edge device receiving a join message of a Layer 3 multicast protocol from a router, and wherein the edge device is an Ethernet switch; and
a multicast address extractor coupled to the companion message identifier.

27. The system of claim 26, further comprising:
storage for information associated with a multicast address, wherein the information is stored in response to the companion message identifier identifying a companion message; and
the companion message comprises the multicast address.

28. The system of claim 27, wherein
the storage is configured to store information associating the multicast address with an interface of a network device and to store information associating the multicast address with a VLAN, wherein
the interface is coupled to a source of the join message.

29. The system of claim 28, wherein
the companion message is received by the network device via the interface.

30. The system of claim 29, wherein
the multicast address is a source address of the companion message.

31. The system of claim 30, wherein
the companion message detector is configured to retrieve the multicast address by parsing the companion message, wherein
the multicast address is comprised in a data field of the companion message.

32. The system of claim 28, wherein
an Ethernet switch comprises the companion message detector and the storage.

33. The system of claim 32, wherein
the companion message detector is configured to determine whether the multicast address is within a set of reserved multicast addresses prior to storing the information,
the set of reserved multicast addresses are reserved for customer use, and
information associated with multicast addresses that are not included in the set of reserved multicast addresses is not stored.

34. The system of claim 28, wherein
the companion message comprises a plurality of multicast addresses, and
the storage is further configured to:
store information associated with each of the multicast addresses in response to the companion message detector detecting the companion message.

35. A system comprising:
an Ethernet switch comprising:
a join message detector; and
a companion message generator coupled to the join message detector, wherein
the companion message generator is configured to generate a companion message in response to the join message detector detecting receipt of a join message of a Layer 3 multicast protocol sent by a router,
the join message identifies a multicast group being joined;
and the companion message comprises an address of the multicast group.

36. The system of claim 35, wherein
the companion message generator is configured to generate a companion message for every Nth join message received subsequent to a first join message.

37. The system of claim 35, wherein
the companion message generator is configured to generate a companion message every t1 seconds.

38. The system of claim 35, wherein
the multicast address is a source address of the companion message.

39. The system of claim 35, wherein the companion message generator is configured to:
generate a second companion message corresponding to the join message, wherein
the join message identifies a plurality of multicast groups being joined, and
the companion message comprises a plurality of multicast addresses, each of the multicast addresses corresponding to a respective one of the multicast groups.

40. The system of claim 35, wherein
the join message detector is configured to maintain information indicating which multicast routers are part of the multicast group.

41. A system comprising:
means for receiving a companion message at a network device, wherein
the companion message comprises a multicast address, wherein the companion message is generated by an edge device in response to the edge device receiving a join message of a Layer 3 multicast protocol from a router, and wherein the edge device is an Ethernet switch; and
means for extracting the multicast address in response to the receiving the companion message.

42. The system of claim 41, further comprising:
means for associating the multicast address with an interface of the network device, wherein
the interface is coupled to a source of the join message; and
means for associating the multicast address with a VLAN (Virtual Local Area Network).

43. The system of claim 42, wherein
receiving the companion message comprises receiving the companion message via the interface, and
the multicast address is a source address of the companion message.

44. The system of claim 42, further comprising:
means for receiving an Ethernet message comprising a multicast destination address;
means for sending the Ethernet message via the interface if the multicast destination address is the multicast address; and
means for flooding the Ethernet message via a plurality of interfaces if the multicast destination address is not the multicast address.

45. The system of claim 42, further comprising:
means for receiving a second companion message via a second interface of the network device, wherein
the second companion message comprises the multicast address; and
means for associating the multicast address with the second interface.

46. The system of claim 45, further comprising:
means for receiving an Ethernet message comprising a multicast destination address;
means for sending the Ethernet message via the interface and the second interface if the multicast destination address is the multicast address; and
means for flooding the Ethernet message if the multicast destination address is not the multicast address.

47. A system comprising:
means for receiving a join message of a Layer 3 multicast protocol from a router, wherein
the join message identifies a multicast group being joined; and
means for generating a companion message corresponding to the join message in response to the receiving the join message, wherein
the companion message comprises an address of the multicast group, and
an Ethernet switch comprises the means for receiving and the means for generating.

48. The system of claim 47, wherein
the multicast address is a source address of the companion message.

49. The system of claim 48, further comprising:
means for generating a second companion message corresponding to the join message, wherein
the join message identifies a second multicast group being joined, and
the second companion message comprises a second multicast address of the second multicast group.

50. The system of claim 47, wherein
the join message identifies a plurality of multicast groups being joined, and
the companion message comprises a plurality of multicast addresses, each of the multicast addresses corresponding to of the multicast groups.

51. A non-transitory computer readable storage medium comprising program instructions executable to:
detect reception of a companion message at a network device, wherein the companion message comprises a multicast address, wherein the companion message is generated by an edge device in response to the edge device receiving a join message of a Layer 3 multicast protocol from a router, and wherein the edge device is an Ethernet switch; and
extract the multicast address in response to the receiving the companion message.

52. The non-transitory computer readable storage medium of claim 51, wherein the program instructions are further executable to:
associate the multicast address with an interface of the network device, wherein the interface is coupled to a source of the join message; and
associate the multicast address with a VLAN (Virtual Local Area Network).

53. The non-transitory computer readable storage medium of claim 52, wherein
the companion message is received via the interface, and
the multicast address is a source address of the companion message.

54. The non-transitory computer readable storage medium of claim 52, wherein the program instructions are further executable to:
detect reception of an Ethernet message comprising a multicast destination address;
send the Ethernet message to the interface if the multicast destination address is the multicast address; and
flood the Ethernet message to a plurality of interfaces if the multicast destination address is not the multicast address.

55. The non-transitory computer readable storage medium of claim 52, wherein the program instructions are further executable to:
detect reception of a second companion message via a second interface of the network device, wherein
the second companion message comprises the multicast address; and
associate the multicast address with the second interface.

56. The non-transitory computer readable storage medium of claim 55, wherein the program instructions are further executable to:
detect reception of an Ethernet message comprising a multicast destination address;
send the Ethernet message to the interface and the second interface if the multicast destination address is the multicast address; and
flood the Ethernet message if the multicast destination address is not the multicast address.

57. A non-transitory computer readable storage medium comprising program instructions executable to:
detect reception, by an Ethernet switch, of a join message of a Layer 3 multicast protocol sent by a router, wherein the join message identifies a multicast group being joined; and
generate a companion message corresponding to the join message in response to the receiving the join message, wherein
the companion message comprises an address of the multicast group.

58. The non-transitory computer readable storage medium of claim 57, wherein
the multicast address is a source address of the companion message.

59. The non-transitory computer readable storage medium of claim 58, wherein the program instructions are further executable to:
generate a second companion message corresponding to the join message, wherein
the join message identifies a second multicast group being joined, and
the second companion message comprises a second multicast address of the second multicast group.

60. The non-transitory computer readable storage medium of claim 57, wherein
the join message identifies a plurality of multicast groups being joined, and
the companion message comprises a plurality of multicast addresses, each of the multicast addresses corresponding to of the multicast groups.

\* \* \* \* \*